Nov. 9, 1937.   G. R. HAUB   2,098,624
GLASS TRANSFER MECHANISM
Filed Jan. 29, 1936   2 Sheets-Sheet 1

Inventor
George R. Haub

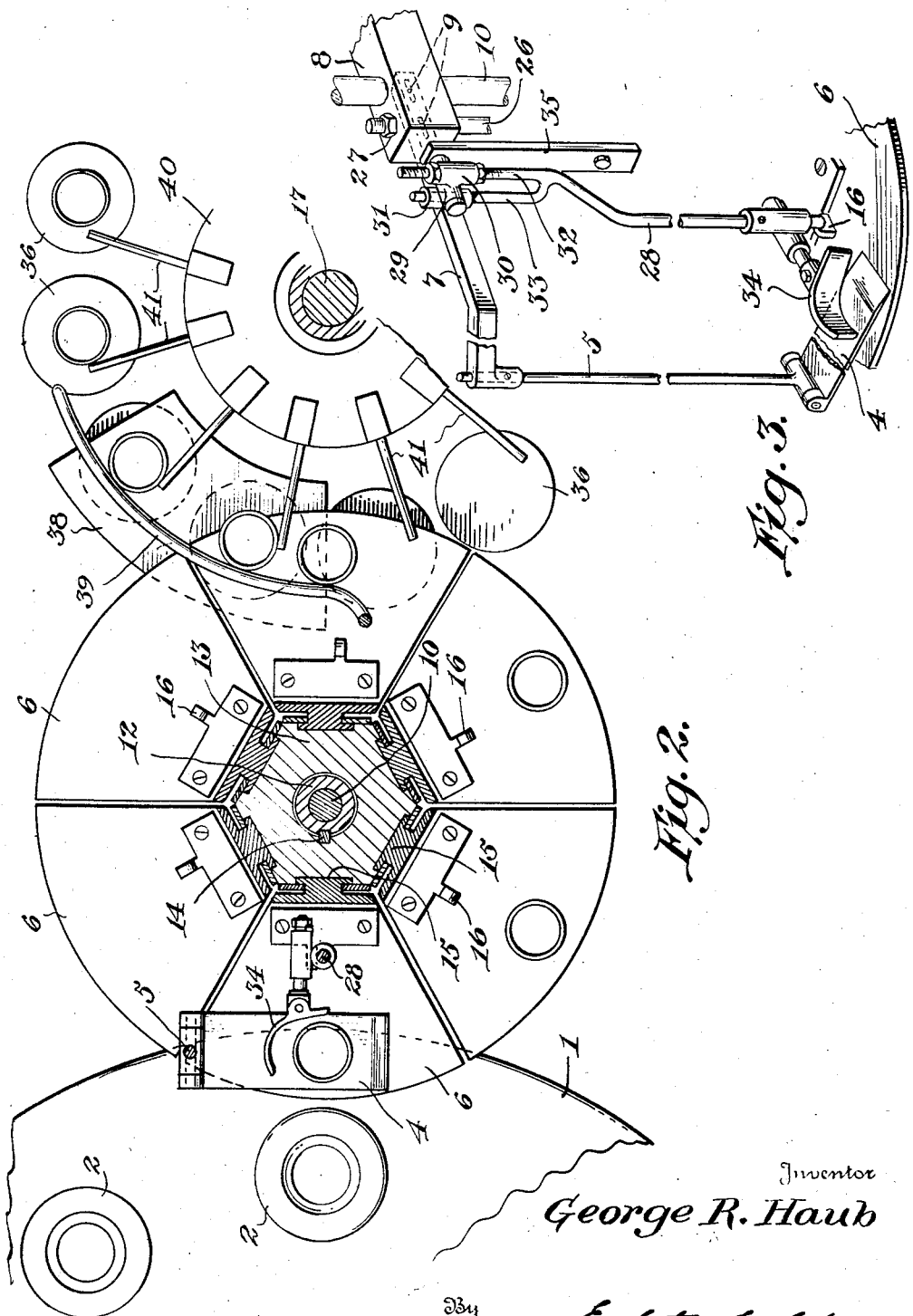

Patented Nov. 9, 1937

2,098,624

UNITED STATES PATENT OFFICE 2,098,624

GLASS TRANSFER MECHANISM

George R. Haub, Zanesville, Ohio, assignor to Hazel-Atlas Glass Company, Wheeling, W. Va., a corporation of West Virginia Application January 29, 1936, Serial No. 61,395

13 Claims. (Cl. 198—25)

The invention relates particularly to means for transferring ware from a press or other glass forming machine to the discs or cups of a continuously moving glazer conveyer.

One of the objects of the invention is to provide a simple and inexpensive mechanism by which the glass articles will be delivered from the forming machine to the cups of the glazer without deforming the articles, which are in a more or less semi-plastic state, due to the present day high speed production.

Another object of the invention is to provide a mechanism which will cause the glass articles to be accurately centered on the glazer cups.

A further object of the invention is to provide a mechanism which can be quickly and easily adjusted to handle ware of different sizes.

Various other objects and advantages of the invention will be apparent to those skilled in the art from the following description, when taken in connection with the accompanying drawings, in which, Figure 1 is a vertical sectional view of the apparatus; parts being omitted and parts being broken away.

Figure 2 is a horizontal sectional view of the apparatus; and

Figure 3 is a perspective view of the mechanism for sweeping the ware onto the steps of the escalator.

Figure 1:
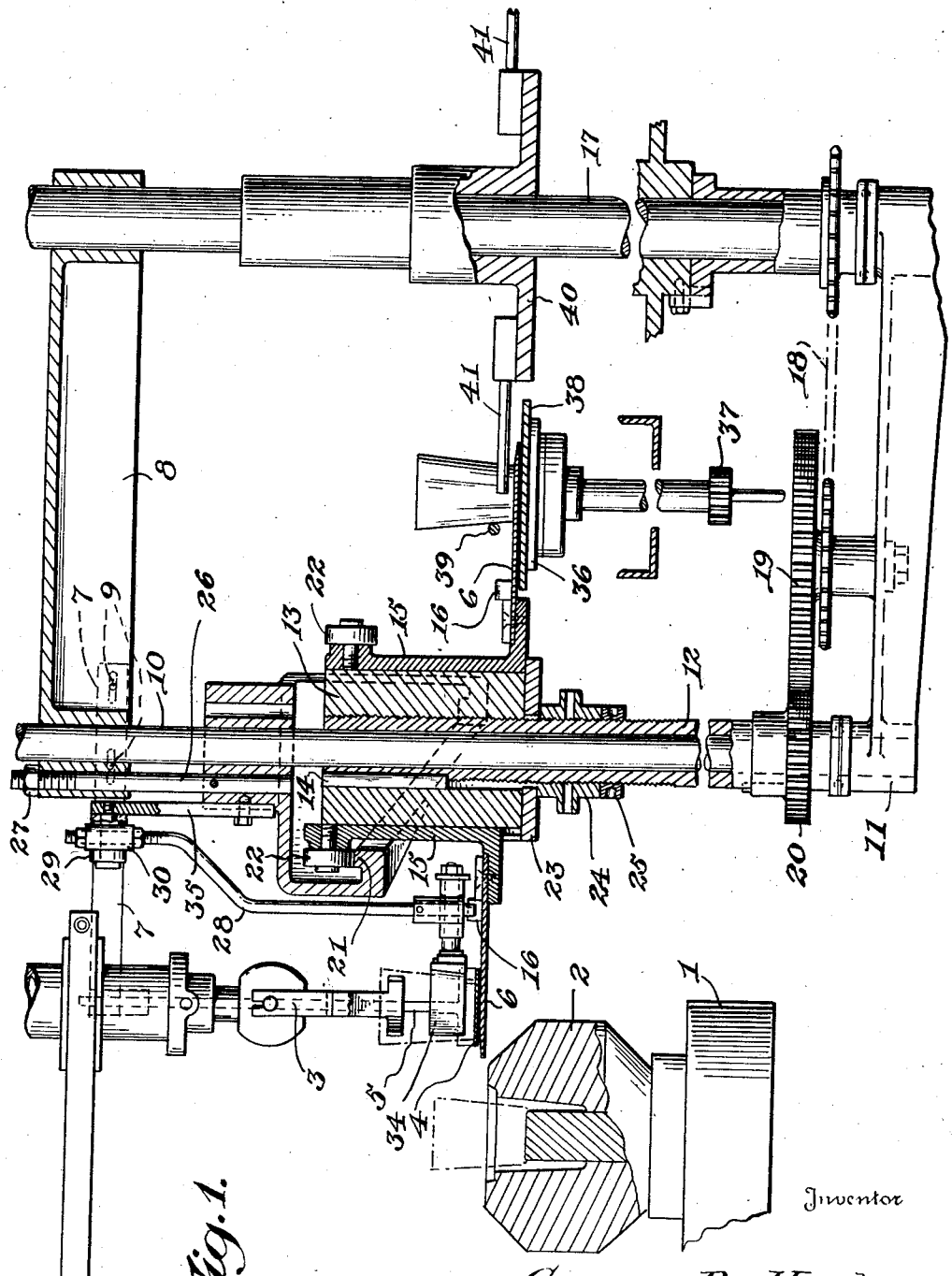

Referring to the drawings in more detail, numeral 1 indicates the table of a forming machine carrying the molds 2. As the molds successively reach the delivery station the articles are elevated in the molds in the usual manner, and a take-out device such as referred to generally by numeral 3 successively lifts the articles and moves them laterally to a position over the dead pan 4 and deposits them on the pan. Various forms of take-out devices are well known and in common use, and it is believed to be unnecessary to illustrate the device in detail.

In the specific transfer mechanism illustrated the rear end of the dead pan 4 is pivotally mounted at the lower end of a rod 5, and the forward end of the dead pan rests on the pads 6 of an escalator. The rod 5 is fixed to an arm 7 which is preferably adjustably mounted on a bracket 8 by means of pin and slot connections 9.

Numeral 10 refers to a fixed standard which extends upwardly from a base member 11 through the bracket 8, and rotatably mounted on the standard is a hollow shaft 12 which carries the head 13 of the escalator. The escalator head is caused to rotate with the shaft 12 as by means of a key 14, but the head is vertically adjustable on the shaft.

Mounted on the escalator head, for independent vertical sliding movement, are a number of slides 15, six in the present instance, and each of these slides carries an escalator pad 6. Each of the pads also carries a lug 16, the purpose of which will appear hereinafter.

The shaft 12 carrying the escalator is continuously rotated by the vertical tail shaft 17 of the glazer by means of chain drive 18 and gears 19 and 20. During the rotation of the escalator the pads 6 are independently raised and lowered by means of a cam 21, upon which ride rollers 22 mounted on the escalator slides 15. In the drawings only one-half of the cam 21 is shown, but it will be understood that the other half is of similar design and permits the escalator pads to gradually descend. The lower limit of the slides and pads carried thereby is determined by the disc 23, and the vertical position of the escalator head 13 is determined by the nuts 24 and 25. The adjustment of the head is required only at the initial set up of the apparatus. In order to take care of glassware of various heights the cam 21 is mounted for vertical adjustment on the standard 10 by means of a rod 26, which extends through the bracket 8 and is maintained in the desired vertical position by means of a nut 27.

The glass articles delivered to the dead pan 4 are periodically swept therefrom onto the continuously revolving escalator pads, which carry the articles through substantially 180° into position to be delivered to the cups of the continuously travelling glazer conveyer.

The mechanism for sweeping the articles from the dead pan 4 will now be described. Numeral 28 refers to a rod pivotally suspended by a horizontal sleeve 29 which carries two vertical sleeves 30 and 31. The upper end of the rod 28 is bifurcated, one fork 32 being mounted for vertical adjustment in the sleeve 30, and the other fork 33 being slidably mounted in the sleeve 31. By this construction the rod 28 is permitted to swing back and forth, but rotation thereof is prevented.

The rod 28, when hanging vertically, reaches almost to the surface of the escalator pads 6 at their receiving position, and mounted on this rod slightly above its lower end is a pusher 34. This pusher bar extends across the dead pan 4 and its outer end portion is preferably curved to conform generally with the curvature of the ware being transferred.

Reference has been made hereinbefore to the lugs 16, one of which is associated with each escalator pad. By reference to the drawings it will be noted that the lower end of rod 28 is directly in the path of these lugs, and that the lugs are of such height they strike the lower end of the rod. It will therefore be apparent that as each escalator pad 6 reaches its receiving position its lug 16 will engage the lower end of the rod 28 and swing it forwardly, thereby carrying the pusher bar 34 forwardly and sweeping the glass article from the dead pan onto the escalator pad.

When the pusher bar has been carried forward the required distance the lower end of the rod 28 clears the lug 16, whereupon the rod and pusher bar swing back to their former position, and are ready for the transfer of the next piece of ware. By reason of this construction proper timing is assured, and each article will be placed in exactly the same position on the escalator pad.

It will be noted that the sleeve 29 which carries the rod 28 is mounted on a plate 35, which plate is fixed to the body of the cam 21, so that when the cam is adjusted up or down the pusher bar 34 will be simultaneously adjusted to the same extent.

The articles having been accurately positioned on the escalator pads, which are continuously moving, are carried around to a delivery position, which in the present form is substantially diametrically opposed to the receiving position. During this travel the articles cool somewhat and are in condition to be delivered onto the cups of the continuously moving glazer conveyer without being deformed, even at the highest speed of production. And of course it is understood that while the articles are being carried from the receiving position to the delivery position they are lowered to substantially the plane of the glazer cups.

The glazer cups are indicated by the numeral 36. These cups continuously travel through a closed path, and at the proper time the cups are rotated by means of pinions 37 engaging a rack (not shown), all of which is well-known in the art. As the cups are rotated during their travel, and also to obtain efficient fire-polishing, it is essential that the glass articles be accurately centered on the glazer cups; and the means for transferring and centering the ware will now be described.

Numeral 38 refers to a dead pan which may be supported by any desired means, and which is positioned just below the escalator pads at their delivery position and just above the glazer cups 36. As the articles approach the delivery position they engage a fixed guide member 39 which guides the articles off the escalator pads and onto the dead pan 38. The guide member 39 is adjustably mounted by any suitable means.

Numeral 40 refers to a continuously rotating centering disc mounted on the glazer tail shaft 17. Radiating from the centering disc are a number of centering fingers 41. The centering fingers travel over the escalator pads 6 and the dead pan 38, and the glazer cups pass beneath the escalator pads and the dead pan. The fingers are so positioned as to engage an articles just as it is about ready to leave an escalator pad and carry the article onto the dead pan and across the dead pan onto a glazer cup as the cup emerges from beneath the dead pan.

During the travel of the glazer cups and the centering fingers the relation between them varies, but the fingers are so positioned that a finger will move just far enough over a cup to exactly center an article thereon, and upon further movement of the parts the finger and cup separate so that the finger has no further effect upon the article.

As the pusher bar 34, the escalator pads 6, the glazer cups 36 and the centering fingers 41 are all driven from the same source the various parts must function in properly timed relation, and each article will be substantially identically placed on its escalator pad and each article will be exactly centered on the glazer cup, in one direction, by the guide 39, and in the other direction by the centering fingers 41, as these fingers travel in a predetermined relation with respect to the glazer cups.

The operation of the apparatus has been fully described in connection with the description of the preferred construction, and further description seems unnecessary.

It is apparent that many changes and modifications of the apparatus may be made without departing from the spirit of the invention, and all such changes and modifications are intended to be included within the scope of the appended claims.

Having fully described the invention, what I claim is:

1. Mechanism for transferring glass articles from a forming machine to the cups of a continuously moving glazer conveyer, including a continuously rotating escalator, vertically movable pads carried by the escalator, means for delivering glass articles from a forming machine to said escalator pads, the pads travelling in timed relation with the cups of a glazer conveyer, and means for delivering a glass article from an escalator pad and centering the article on a glazer cup.

2. Mechanism for transferring glass articles from a forming machine to the cups of a continuously moving glazer conveyer, including a continuously rotating escalator, vertically movable pads carried by the escalator, means for delivering glass articles from a forming machine to said escalator pads, the pads travelling in timed relation with the cups of a glazer conveyer, said escalator lowering the glass articles to substantially the plane of the glazer cups, and means for delivering a glass article from an escalator pad and centering the article on a glazer cup.

3. Mechanism for transferring glass articles from a forming machine to the cups of a continuously moving glazer conveyer, including a rotating conveyer, means for delivering glass articles from a forming machine to the rotating conveyer, said rotating conveyer operating in timed relation with the cups of a glazer conveyer and carrying the articles to a position adjacent the cups, said cups passing just beneath the rotating conveyer, and fingers moving over the rotating conveyer in timed relation with the cups, a guide member; said fingers in cooperation with the guide member sweeping the articles from the rotating conveyer to centered position on the glazer cups.

4. Mechanism for transferring glass articles from a forming machine to the cups of a continuously moving glazer conveyer, including a rotating conveyer, means for delivering glass articles from a forming machine to the rotating conveyer, said rotating conveyer operating in timed relation with the cups of a glazer conveyer and carrying the articles to a position adjacent the cups, a dead pan arranged under the rotating conveyer, said cups passing just beneath the rotating conveyer and said dead pan, and fingers moving over the rotating conveyer and dead pan in timed relation with the cups, a guide member, said fingers in cooperation with the guide member sweeping the articles from the rotating conveyer and across the dead pan to centered position on the glazer cups.

5. Mechanism for transferring glass articles from a forming machine to the cups of a continuously moving glazer conveyer, including a rotating escalator, vertically movable pads carried by the escalator, means for delivering glass articles from a forming machine to said escalator pads, the pads travelling in timed relation with the cups of a glazer conveyer, said escalator carrying the articles from substantially the plane of the forming machine molds to substantially the plane of the glazer cups, said cups passing beneath the escalator pads, and fingers moving over the escalator pads in timed relation with the cups, a guide member, said fingers in cooperation with the guide member sweeping the articles from the escalator pads to centered position on the glazer cups.

6. Mechanism for transferring glass articles from a forming machine to the cups of a continuously moving glazer conveyer, including a rotating escalator, vertically movable pads carried by the escalator, means for delivering glass articles from a forming machine to said escalator pads, the pads travelling in timed relation with the cups of a glazer conveyer, said escalator carrying the articles from substantially the plane of the forming machine molds to substantially the plane of the glazer cups, a dead pan arranged under the escalator pads, said cups passing just beneath the escalator pads and said dead pan, and fingers moving over the escalator pads and dead pan in timed relation with the cups, a guide member, said fingers in cooperation with the guide member sweeping the articles from the escalator pads and across the dead pan to centered position on the glazer cups.

7. Mechanism for transferring glass articles, including a conveyer, a dead pan arranged over the conveyer, means for placing glass articles on said dead pan, a pusher arranged over the dead pan, and means carried by and travelling with the conveyer for operating the pusher to sweep an article from the dead pan to said conveyer, said last-mentioned means permitting the pusher to return to its original position after the article has been delivered to the conveyer.

8. Mechanism for transferring glass articles, including a conveyer, a dead pan arranged over the conveyer, means for placing glass articles on said dead pan, a pusher arranged over the dead pan, means carried by and travelling with the conveyer for operating the pusher to sweep an article from the dead pan to said conveyer, said pusher returning to its original position by gravity.

9. Mechanism for transferring glass articles, including a rotary conveyer, a dead pan arranged over the conveyer, means for placing glass articles on the dead pan, a pusher arranged over the dead pan, means for swingingly mounting the pusher, and a lug carried by said rotary conveyer, said lug adapted to swing the pusher to sweep an article from the dead pan to the conveyer.

10. Mechanism for transferring glass articles from a forming machine to the cups of a continuously moving glazer conveyer, including a rotating escalator, vertically movable pads carried by the escalator, a dead pan associated with the escalator, means for delivering glass articles from a forming machine to the dead pan, a pusher arranged over the dead pan, means carried by the escalator pads for operating the pusher to sweep the articles from the dead pan to the escalator pads, said escalator carrying the articles from substantially the plane of the forming machine molds to substantially the plane of the glazer cups, and means for delivering the glass articles from the escalator pads to centered position on the glazer cups.

11. Mechanism for transferring glass articles from a forming machine to the cups of a continuously moving glazer conveyer, including a rotating escalator, vertically movable pads carried by the escalator, a dead pan associated with the escalator, means for delivering glass articles from a forming machine to the dead pan, a pusher arranged over the dead pan, lugs carried by the escalator pads, said lugs adapted to operate the pusher to sweep the articles from the dead pan to the escalator pads, said escalator carrying the articles from substantially the plane of the forming machine molds to substantially the plane of the glazer cups, and means for delivering the glass articles from the escalator pads to centered position on the glazer cups.

12. Mechanism for transferring glass articles, including a rotary escalator, vertically movable pads carried by the escalator, a dead pan associated with the escalator, a pusher adapted to sweep an article from the dead pan to a pad of the escalator, and means for simultaneously vertically adjusting the pusher and the escalator pads.

13. Mechanism for transferring glass articles, including a rotary escalator, vertically movable pads carried by the escalator, a dead pan associated with the escalator, a pusher arranged over the dead pan, means for movably mounting the pusher, means carried by and travelling with the escalator pads for operating the pusher to sweep an article from the dead pan to a pad of the escalator, and means for simultaneously vertically adjusting the pusher and the escalator pads.

GEORGE R. HAUB.